March 13, 1962 R. K. DUFFIN 3,025,062
REENFORCED WOOD ARTICLE OF MANUFACTURE
Filed June 18, 1959
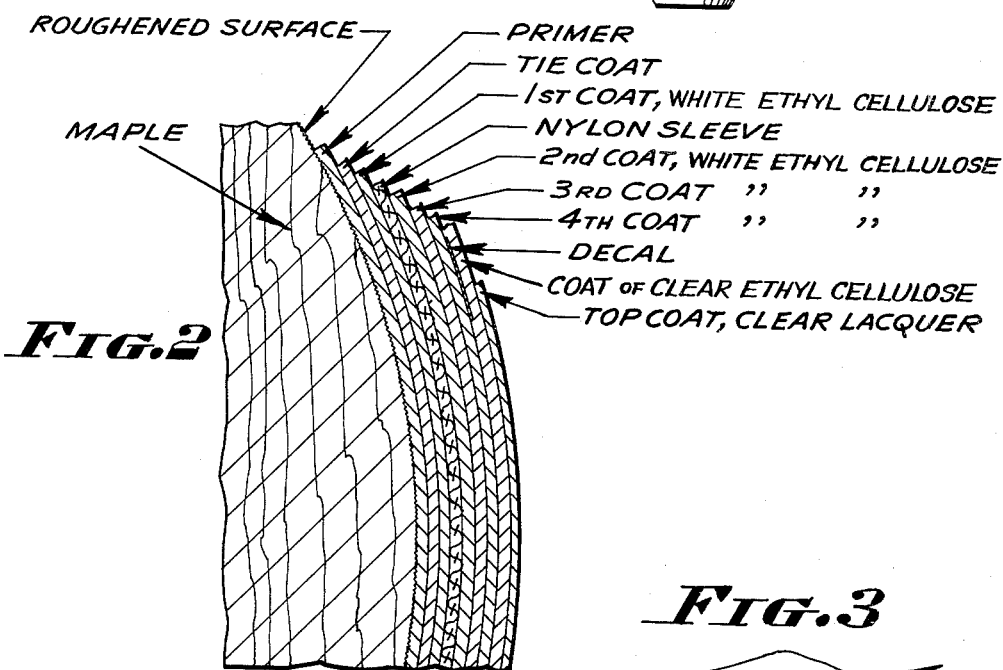
INVENTOR.
BY: ROBERT K. DUFFIN
Beau, Brooks, Buckley & Beau,
ATTORNEYS.

United States Patent Office 3,025,062
Patented Mar. 13, 1962

3,025,062
REENFORCED WOOD ARTICLE OF MANUFACTURE
Robert K. Duffin, East Aurora, N.Y., assignor to Pierce & Stevens Chemical Corp., Buffalo, N.Y.
Filed June 18, 1959, Ser. No. 821,243
2 Claims. (Cl. 273—82)

This invention relates to a covering for wooden surfaces and articles, to protect them against severe impact damage and deterioration. More particularly, this invention relates to the provision of wood articles with tough and effective protective coverings, and has specific reference to protectively coated wooden implements such as bowling pins (ten pins, duck pins, candle pins) and baseball bats and the like, which are subjected to severe impact conditions.

Such wooden surfaces are under normal service conditions subjected to stresses causing them to tend to chip, check, dent and splinter, and embrittlement of such wooden surfaces due to dehydration aggravates this tendency. Heretofore attempts have been made to surface coat bowling pins or the like, so as to be more durable than the usual wooden bowling pins, but with only partial success. Furthermore, bowling pins and baseball bats, for example, are ordinarily manufactured from better quality grades of such types of wood as maple, ash or hickory, which are becoming increasingly scarce materials, and while attempts have been made to produce bowling pins and baseball bats and the like from lower quality woods by coating the articles to give them greater strength and reduced susceptibility to breakage and surface damage, completely satisfactory results have not been realized.

Also, it is very important that the coating material be applied to the wood base in a manner so that there are no air spaces between the parts, and so that the coating component of the finished article will not tend to "oil-can" under impact stresses. Such conditions will interfere for example with the proper performance of the article as exemplified by its scorability and "sound" when struck by a bowling ball, and will definitely tend to permit springy flexures of the coating component so as to accelerate separation from the wood substrate and fracturing and deterioration thereof.

It is a primary object of the invention to provide a novel composite coating for wooden surfaces and articles as aforesaid, which is tough, dense, impact-absorbing and substantially non-springy and therefore impact-conformable to the wood substrate when dented, thus providing the finished article with superior resistance to surface deterioration and breakage. It is another object to provide a coating for wood bowling pins, which is economical to fabricate from materials readily obtainable. It is also of course a particular object of the invention to provide a novel composite coating fabrication for various wooden articles such as bowling pins and baseball bats so as to secure greater endurance and substantially extended useful life spans for such equipment.

It is another object to provide a coating possessing the advantages set forth hereinabove, without detracting from or altering desirable performance features and appearances of conventional wooden surfaces and articles for such purposes.

Still another object is to provide an improved coating as aforesaid, which is structurally reenforced by a hose-like fabric sleeve incorporated within the coating at an improved sectional position therein, whereby to reenforce the composite coating in improved manner against flexure in the manner of the well known "oil-canning" phenomenon, thus avoiding undue deterioration from flexing fatigue effects.

Other objects and advantages of the invention will be apparent from the following specification and drawing, wherein:

FIG. 1 is a side elevational view of a bowling pin, with a portion broken away to show the interior;
FIG. 2 is a fragmentary sectional view on an enlarged scale showing the composite coating construction; and
FIG. 3 is a view of a fabric reenforcement element of the coating structure, prior to incorporation therein.

Whereas, it is known that fabric-reenforced wood articles have been previously covered with multi-layer coatings by spraying, brushing, or dipping operations thereon, such as for example in U.S. Patents No. 2,610,057 and 2,656,294, the present invention contemplates formation of the composite coating by an improved combination of coating components, including incorporation of the fabric reenforcement at a new and improved position, sectionally, within the composite coating. For example, according to the present invention, wooden surfaces and articles may advantageously be protectively covered with a multi-component coating system the method of which preferably comprises first roughing the wood surfaces as by sanding or the like to give the wood "tooth;" and then applying at least one priming layer preferably of a material such as for example a polyvinyl acetate water emulsion. Then a "tie coat" comprising a layer of any suitable nitrocellulose base lacquer (including suitable solvents and plasticizers) is applied over the priming layer of polyvinyl acetate. A layer of an ethyl cellulose lacquer containing solvents and plasticizers with or without pigment as preferred is then applied over the nitrocellulose layer. An ethyl cellulose lacquer, as is conventionally understood, is a formulation that is particularly adapted for dip application in order to obtain relatively thick coatings with minimum application effort. Frequently a coating having a 5 to 20 mil and greater thickness can be obtained readily from a single dip of the article in the lacquer composition. The lacquer may advantageously be formulated with an ethyl cellulose having an ethoxyl content, usually designated "medium," in the range from about 45 to about 46.5 percent by weight which contains an average of between about 2.25 and 2.35 etherified ethyl substituents per glucose unit. It may have a viscosity between about 10 and 200 centipoises, as determined in a solution of about 5 percent by weight of the ethyl cellulose in a solvent mixture consisting of about 80 parts by volume of toluene and about 20 parts by volume of ethanol. It is frequently beneficial to employ a cellulose ether having a viscosity between about 50 and 100 centipoises. If desired, light stabilizers and the like can be incorporated in the cellulose ether to inhibit its discoloration on exposure to light and weathering.

Ethyl cellulose lacquers can be prepared with a variety of known solvents for dissolving the cellulose ether. Beneficially, however, the medium grade of ethyl cellulose lacquers which are advantageously employed in the practice of the present invention may be prepared with a solvent mixture of about 70 to 80 parts by weight of toluol; about 20 to 30 parts by weight of ethyl alcohol. Solvents or solvent mixtures having equivalent solvent power for ethyl cellulose and which are commensurate in other characteristics may, of course, also be utilized.

It is frequently desirable to plasticize the ethyl cellulose for formation of the lacquer. A variety of known plasticizers and resins are available for this purpose. Advantageously, however, an alkyd type resin composition or a hydrocarbon resin such as poly alpha methyl styrene having a viscosity of about 900 centipoises at 60° C. may be employed. Ordinarily, it is advantageous to employ not more than 50 percent by weight of the plasticizer, based on the total weight of the plasticized ethyl cellulose.

The lacquers can be prepared with varying dissolved solids contents (which includes the weight of the ethyl cellulose and the plasticizer). While a dissolved solids content in the neighborhood of 20–30 percent by weight is normally suitable, it can be varied over wide limits within and without the mentioned range, depending on the coating thickness which is desired to be obtained in each dipping operation and the number of dips to be employed. Usually it is desirable for the complete application of the lacquer to be accomplished in one or two dipping operations. The aforesaid layers may be applied by any suitable technique, such as brushing, flow coating or dipping. Each applied layer is preferably permitted to dry thoroughly before application is made of the succeeding layer.

As a next step in the method of fabrication of the composite coating of the present invention, a fabric sleeve as shown in FIG. 3 is lip-fitted over the previously dried surface provided as explained hereinabove. This sleeve is preferably in the form of a seamless hose-like fabric comprising meshed nylon filaments so woven together as to render the fabric stretchable and resilient in all directions. Hence, when the sleeve is pulled over the substrate structure it stretches and elastically conforms to the bowl shape of the structure, thereby smoothly covering the latter (FIG. 2). Next, another layer of ethyl cellulose lacquer is applied over the nylon sleeve. This application reactivates the first coat of ethyl cellulose through the sleeve, and causes the sleeve to become embedded within two fused-together coatings of ethyl cellulose. Preferably, additional coatings of ethyl cellulose lacquer are then successively applied, as designated in FIG. 2 of the attached drawing as the 3rd and 4th coats respectively; to build up an ethyl cellulose layer of substantial thickness relative to the nylon sleeve externally thereof. The ethyl cellulose layers are preferably of pigmented material to give the finished product the desired finish color and appearance.

A decalcomania or other indicia bearing layer may then be applied as shown in FIG. 2 for identification of the product whenever desired; and finishing coats of clear ethyl cellulose and of clear nitrate lacquer are then preferably applied, to give the finished product a hard transparent dirt-resistant outer shell.

It is a particular feature of the invention that the solvent combination in the ethyl cellulose lacquer applications has an optimum wetting action on the nylon filaments, thereby facilitating penetration of the fabric and reducing tendencies for entrapment of air therein. Additionally, the solvent combination causes slight swelling and solvating of the nylon to promote an improved fusion and adhesion effect.

It is another feature of the present invention that by virtue of the construction shown and described hereinabove the internal reenforcing nylon fabrication becomes embedded in filament-locked relation interiorly of the inner portion of the composite covering, as distinguished from being located adjacent the outer surface of the finishing product. Consequently, the composite coating is reenforced in superior manner against impact forces such as when a bowling pin of this construction is struck by a bowling ball. Due to the curvature of the bowling pin, if the nylon sleeve were to be disposed in the outer shell portion of the coating, the latter would be vulnerable to "oil-canning" tendencies when heavily struck, whereas in the case of the present invention the nylon sleeve seems to function effectively to pretension the inner section of the composite coating so as to prevent any such "oil-canning" effects. As a result, the system of the invention is much less vulnerable to tendencies to flex and check and crack and splinter, than are previously designed articles of manufacture for similar purposes.

I claim:

1. A bowling pin comprising a wooden body of substandard diameter, the surface of said body being roughened, base coat means firmly bonded to said body and presenting a good bonding base for ethyl cellulose at its outer surface, a coating of ethyl cellulose covering said base coat means, a one piece synthetic fiber sleeve embracing said body and covering said coating of ethyl cellulose, and successive coatings of ethyl cellulose on said body whereby said fabric is contained within and reinforces the ethyl cellulose and is physically removed from said base coat means so as to spread localized impact loads to a relatively large area of said body, said base coat means, said coating of ethyl cellulose on the base coat means and said successive coatings of ethyl cellulose being continuous through and devoid of seams.

2. The bowling pin according to claim 1 wherein said base coat means consists of a coating of polyvinyl acetate applied directly to said body and a coating of nitrocellulose base lacquer applied over said polyvinyl acetate coating.

References Cited in the file of this patent

UNITED STATES PATENTS

| | | |
|---|---|---|
| 2,199,310 | Hartley | Apr. 30, 1940 |
| 2,535,033 | Bergere | Dec. 26, 1950 |
| 2,600,856 | Decepoli | June 17, 1952 |
| 2,600,951 | Edwards | June 17, 1952 |
| 2,610,057 | Hunt | Sept. 9, 1952 |
| 2,656,294 | Hunt | Oct. 20, 1953 |
| 2,797,923 | Dettman | July 2, 1957 |
| 2,804,399 | Kelly et al. | Aug. 27, 1957 |
| 2,813,818 | Pearson | Nov. 19, 1957 |

FOREIGN PATENTS

| | | |
|---|---|---|
| 782,249 | Great Britain | Sept. 4, 1957 |